United States Patent [19]

Hawk

[11] Patent Number: 4,915,179

[45] Date of Patent: Apr. 10, 1990

[54] DOUBLE-ACTION ARTICULATED CULTIVATING TOOL

[76] Inventor: Ernest D. Hawk, 7463 Canyon Dr., Yucca Valley, Calif. 92284

[21] Appl. No.: 230,473

[22] Filed: Aug. 9, 1988

[51] Int. Cl.$^4$ ............................ A01B 1/06; A01B 1/20
[52] U.S. Cl. .................................... 172/375; 172/376; 172/378
[58] Field of Search ............... 172/376, 375, 372, 378, 172/380, 371

[56] References Cited

U.S. PATENT DOCUMENTS

| | | | |
|---|---|---|---|
| D. 139,367 | 11/1944 | Keller | D35/2 |
| 199,481 | 1/1978 | Thomas. | |
| D. 274,116 | 6/1984 | Lidikay | D8/6 |
| 1,167,491 | 1/1916 | Gilson | 172/376 X |
| 1,794,284 | 2/1931 | Fulknier, Jr., et al. | |
| 2,539,351 | 1/1951 | Gress | 172/376 X |
| 2,988,157 | 6/1961 | Lindstaedt | 172/376 |
| 3,965,991 | 6/1976 | Eads et al. | 172/376 |
| 4,093,031 | 6/1978 | Portz | 172/376 |
| 4,212,150 | 7/1980 | Dmochowski | 56/400.06 |
| 4,483,133 | 11/1984 | Pasley | 56/400.06 |

FOREIGN PATENT DOCUMENTS

| | | | |
|---|---|---|---|
| 759623 | 11/1933 | France | 172/375 |
| 64546 | 2/1926 | Sweden | 172/375 |
| 893467 | 4/1962 | United Kingdom | 172/375 |

OTHER PUBLICATIONS

Sketch of a prior-art tool.

*Primary Examiner*—Richard J. Johnson
*Attorney, Agent, or Firm*—Richard L. Gausewitz

[57] ABSTRACT

A garden tool having a cultivating blade portion and a cultivating tine portion provided at the end of a relatively long handle. The blade portion is generally U-shaped and is substantially equal in width to the tine portion. The blade portion is articulated relative to the tine portion.

9 Claims, 1 Drawing Sheet

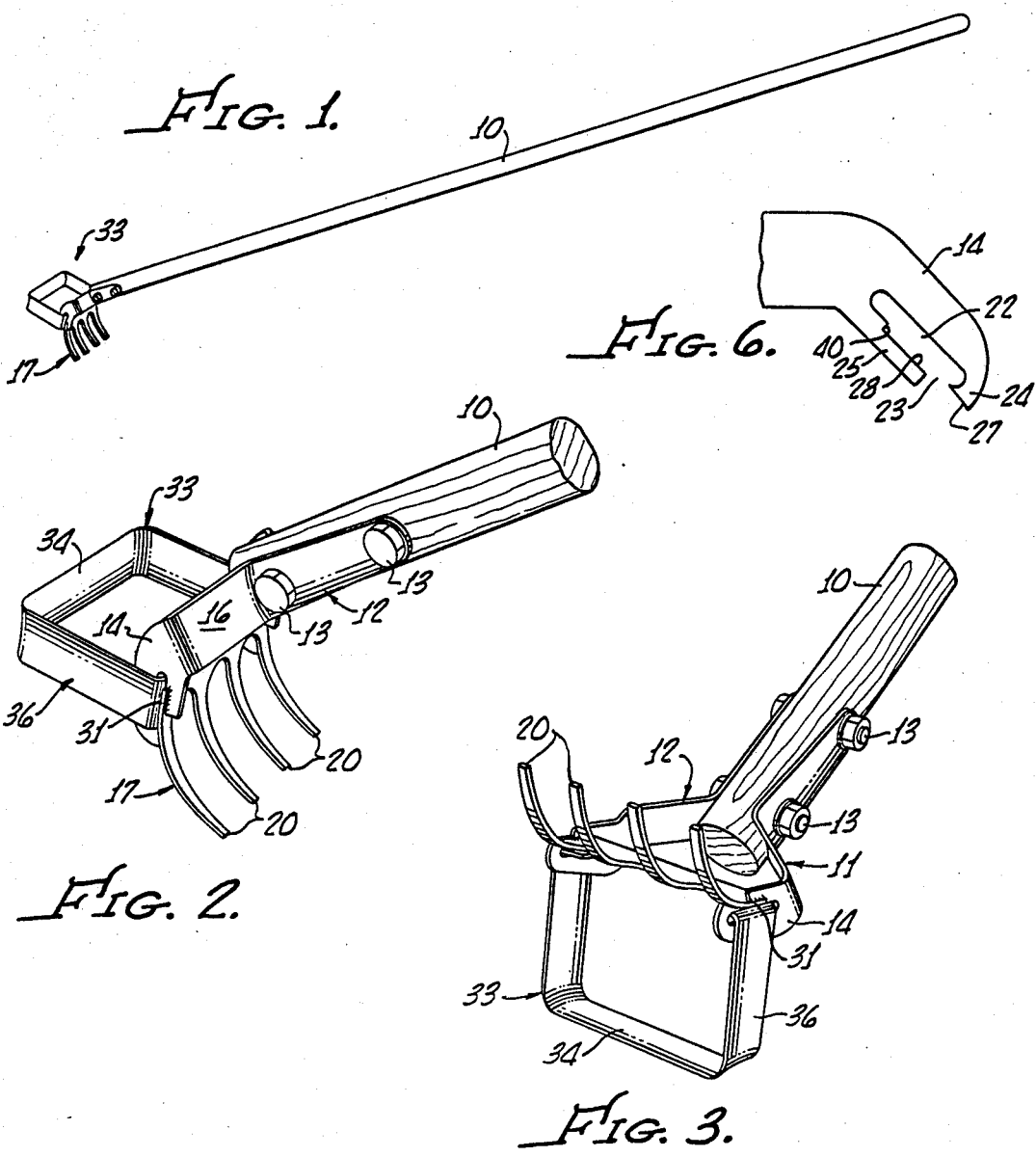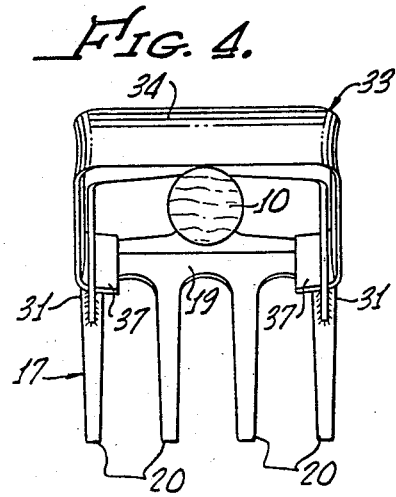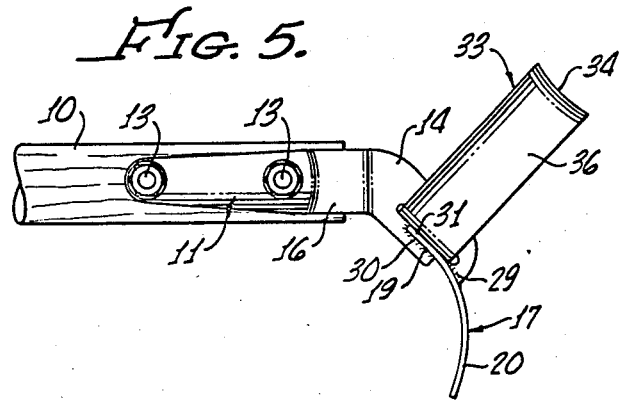

DOUBLE-ACTION ARTICULATED CULTIVATING TOOL

BACKGROUND OF THE INVENTION

There is a major need, in the field of manually-operated cultivating tools, for a cultivator which is relatively easy to operate—even by elderly persons. There is also a need for a properly-operating small cultivator that can be easily used in confined flower beds, tree wells, small yards, etc. It is essential that a relatively small force will cause effective operation of the cultivator. It is important that the cultivator be operable with back-and-forth motions and not merely motions in a single direction.

In addition to the above, it is important that the cultivating tool be simple and economical to manufacture, be such that the articulated blade element may be replaced in a matter of seconds, and be such that the articulated blade element will not twist of skew even if no skew-prevention bar is extended between the mounting portions of the articulated blade.

SUMMARY OF THE INVENTION

The present tool has a cultivating blade portion and a cultivating tine portion provided at the end of a relatively long handle the blade portion being articulated relative to the tine portion. The blade and tine portions have substantially equal widths relative to each other, such widths being small.

The width of the tine portion is substantially equal to that of the blade portion. Each of such portions has a width of about 3.5 inches, although small variations from such width are possible but with adverse consequences.

The blade portion has ends that can be sprung apart and then inserted into openings in mounting elements that support both the tine and blade portions. The relationships are such that the blade portion can pivot through a few degrees relative to the tine portion and relative to the handle, the result being that the cutting edges of the blade portion are properly oriented relative to the earth regardless of whether the tool is being pushed or pulled. The amount of pivoting of the tine portion is about six degrees total.

The blade portion, when in an intermediate position, is at an angle of about forty-five degrees relative to the axis of the handle. The tine portions are curved, their end regions being at an angle of about ninety degrees to the handle.

The blade portion is substantially rectangular—approaching a square—as distinguished from being flared or divergent. Such "square" relationship eliminates the need to provide a skew-prevention bar between the opposed mounting end portions of the blade portion.

The mounting elements for the tine portion and blade portion have arms that cooperate with weld regions to not only s provide effective and strong mounts for the tine portion but to provide openings through which the mounting ends of the blade portion extend.

BRIEF DESCRIPTION OF THE DRAWING

FIG. 1 is an isometric view showing the entire tool;
FIG. 2 is an isometric view showing the left portion of FIG. 1, the tool being in position for cultivating by means of the tine portion of the tool;

FIG. 3 corresponds generally to FIG. 2 but shows, from a different angle, the tool in inverted position at which the blade portion is operative;

FIG. 4 is an end elevational view of the tool, looking toward the handle end from the left region of FIG. 2; and FIG. 5 is a side elevational view of the tool, showing the angles of the elements and showing the weld regions.

DETAILED DESCRIPTION OF THE PREFERRED EMBODIMENT

Referring to the drawings, the double-action articulated cultivating tool has an elongated handle 10 which is caused to be about five feet long for persons of average height, the handle length being significant in order that the angular relationships of the cultivator portions relative to the earth will be correct.

Mounted at the end of handle 10 are right and left arms 11,12, respectively. Such mounting of the arms on the handle is effected by bolts 13 (or rivets) extending through handle 10 as shown in FIGS. 2 and 3. Arms 11,12 not only have portions that fit on opposite sides of handle 10, but have distal as portions 14 that are generally parallel to each other and that are bent so as to incline downwardly when the tool is in position (shown in FIG. 2) for use of the tined portion.

The portion of each arm 11,12 that engages handle 10, and also an intermediate outwardly-bent portion 16 of each such arm that connects directly to such handle-engaging portion, all have their central axes lying in a single plane which contains the axis of handle 10. On the other hand, distal portions 14 of the arms 11,12 bend at a substantial angle to such plane. The direction of bend is such that the distal portions 14 extend downwardly when the tool is in position for use of the tined portion thereof.

The tined portion of the tool is given the general number 17, being a sheet-metal element that is sufficiently thick that the tines or teeth are substantially rigid and unbending. Tined portion 17 has a base 19 (FIGS. 4 and 5) from which extend, at equally-spaced intervals, a small number of tines or teeth 20. There are four teeth the centers of which are spaced about one inch apart, and each tooth converges somewhat from the base 19 toward the tips of the teeth. The base 19 is about 3.5 inches wide, this being somewhat greater than the approximately 3-inch distance between the outside teeth.

The tined portion 17, including both base 19 and teeth or tines 20, lies along the surface of a substantial cylinder the radius of which is about 1⅜ inches. After the mounting of the tine portion as described below, the tip regions of the tines or prongs are generally at 90-degree angles relative to the axis of the handle.

Referring next to FIG. 6, the distal portion 14 of each arm 11,12 has a slot or opening 22 therein. Such slot or opening is not, prior to welding of the tine portion 17 therein, closed but instead communicates through a gap 23 with the surrounding region. Gap 23 is defined on one side by hooked-over portion 24, and on the other side by the tip of an elongated arm 25, both of the elements 24,25 being integral with distal portions 14 of the right or left arm 11,12. The end of hooked-over portion 24 is numbered 27, and is offset somewhat upwardly (as shown in FIG. 6) from the inner edge 28 of arm 25.

Tine portion 17 is welded to arms 11,12, by inserting base 19 into gap 23, in such relationship that part of one side of the base engages end 27, while part of the other side of the base engages edge 28, it being understood that the thickness of the base 19 corresponds generally to the amount of the above-indicated offset. The edge of tined portion 17 remote from teeth 20 engages shoulders 23, which act as stops. A weld 29 (FIG. 5) is made between end 27 and base 19, while a weld 30 is made between the other side of base 19 and edge 28 of arm 25. In this manner, gap 22 is closed while, in addition, the slot 22 is properly sized and adapted for reception of mounting ends of the blade portion next described.

The base 19 of tined portion 17 has a width (the left-right dimension as viewed in FIG. 4) somewhat greater than the spacing between distal portions 14 of arms 11,12. Such width of base 19 preferably about 3.5 inches, while the spacing between the distal portions 14 is about 3⅛ inches. Thus, protuberant or shelf portions 31 are provided as indicated in FIGS. 3 and 4. The presence of the shelves 3,1 provides space for welding and, furthermore, backs up corner regions of the blade portion for protection thereof during cultivating by tined cultivator portion 17.

Referring next to the blade portion of the cultivating tool, this is numbered 33, being a generally rectangular steel member having a blade 34 that is generally parallel to base 19 of tined portion 17. The blade portion of the tool also has sides 36 that are substantially parallel to each other, and bent-over ends 37 that snap inwardly through slots or opening 22 in distal portions 14 of arms 11,12. The blade portion preferably approaches square, because blade 34 is about 3.5 inches long while sides 36 are about 2¾ inches long.

The portions 17 and 33 have substantially the same dimensions in a direction perpendicular to a vertical plane containing the axis of handle 10, when the tool is in the FIG. 2 position.

Very preferably, nothing extends between the bent-over ends, since nothing is required in that the substantially rectangular shape of blade portion 33 prevents substantial skew even when one end of the blade 34 strikes a rock, for example.

The metal forming the blade portion 33 is sufficiently flexible and springy that the sides 36 may be sprung apart in order to permit introduction of bent-over ends 37 through slots 22 to thus mount the blade portion 33 on arms 11,12.

The relationships between the sizes and thicknesses of bent-over ends 37, and the dimensions of slots 22, are such that the blade portion 33 is articulated relative to remaining parts of the tool, but may pivot only a relatively small number of degrees. The direction of pivoting is between the lower-left and upper-right when the tool is in the position of FIG. 3, and results from the interaction between blade 34 and the earth. The pivoting cause the cutting edges of blade 34 to be at the proper angles for cultivating and weed cutting. The total amount of such pivotal movement is about 6 degrees.

The angle between the axes of sides 36 and a horizontal plane (when the rake is in the position of FIG. 5) containing the axis of handle 10 is about 45 degrees. This creates the correct relationship for pushing and pulling of the tool when s the tool is in the FIG. 3 position, so that the cutting edges along each side of blade 34 are properly oriented to the ground. Blade 34 is preferably somewhat concave as viewed from below (FIG. 3), and ha a self-sharpening action.

MANUFACTURING, AND OPERATION

To manufacture the tool, the arms 11,12 are stamped and bent into the described shapes, and the tined portion 17 is also stamped and bent into the described shape. Arms 11,12 are then mounted in a jig, and the base 19 of tined portion 17 is mounted between surfaces 27,28 (FIG. 6), following which the welds 29,30 (FIG. 5) are made. The assembly of the arms and tined portion is then mounted on handle 10 by means of bolts 13, following which the blade portion 33 is quickly mounted in position by merely springing apart the sides 36 thereof and then letting the end portions 37 penetrate the slots 22.

In use, the gardener typically starts by using the blade portion 33 of the double-action articulated cultivating tool, the tool being then in the position of FIG. 3. The gardener both pushes and pulls on the handle 10 to move the blade 34 back and forth, which results in the pivotal blade movement relative to the rest of the tool as described above. The cutting edges of the blade 34 are thus properly oriented during both pushing and pulling. Because the blade 34 is so short, and is at the correct angle relative to the ground, the cutting and cultivating action is extremely easy in comparison to conventional tools and is substantially easier than what would occur if the tined portion 17 were first employed.

After cultivation has occurred, for example between rows of flowers or vegetable, the tool is turned over to the position of FIGS. 1 and 2, following which the tined portion 17 is used to further break up the earth, etc. This action using the tined portion 17 is much more easy than would be the case if it had not been preceded by use of the blade portion 33. Fertilizer may be worked in with the tool. The result is a double-action articulated cultivating tool that is believed to exceed the capabilities of any tool (of the same general class) in the prior art.

The foregoing detailed description is to be clearly understood as given by way of illustration and example only, the spirit and scope of this invention being limited solely by the appended claims.

I claim:

1. A double-action articulated cultivating tool, which comprises:
   (a) an elongate handle,
   (b) right and left arms mounted on said handle at one end thereof,
      each of said arms extending outwardly from said handle and having a distal portion that is generally parallel to a plane containing the axis of said handle, each of said distal portions having a slot therein,
   (c) a tined portion mounted on said distal portions and extending therefrom in a direction away from a second plane containing said axis and perpendicular to said first-mentioned plane, and
   (d) a blade portion mounted on said distal portions in articulated relationship,
      said blade portion extending away from said second-mentioned plane in a direction generally opposite to the direction of extension of said tined portion, said tined portion and said blade portion each having a short dimension in a direction perpendicular to said first-mentioned plane.

2. The invention as claimed in claim 1, in which said blade portion has sides that flex and that connect to bent-over end portions adapted to be inserted inwardly through said slots after said sides have flexed apart, the sizes of said end portions relative to the sizes of said slots being such that said blade portion may pivot through a small angle in directions generally parallel to said first-mentioned plane.

3. The invention as claimed in claim 1, in which said blade portion lies at an angle, relative to second-mentioned plane, that is about 45 degrees.

4. The invention as claimed in claim 3, in which the relationships between said bent-over end portions an said slots is such that the amount of said pivoting is about six degrees.

5. The invention as claimed in claim 1, in which said tined portion has end regions that extend away from said second-mentioned plane at substantially right-angles relative thereto, said tines being somewhat curved so as to be convex on the side of the tool remote from said handle.

6. The invention as claimed in claim 1, in which said blade portion is generally rectangular, and has substantially the same dimension as said tined portion in a direction parallel to said second-mentioned plane.

7. The invention as claimed in claim 1, in which each of said distal portions has a gap therein that communicates with said slots, in which said tined portion has a base inserted through said gap into said slots, said base being welded to said distal portions at opposite sides of said gaps.

8. A double-action articulated cultivating tool, which comprises:
   (a) an elongate handle,
   (b) right and left arms mounted on said handle at one end thereof,
      each of said arms extending outwardly from said handle and having a distal portion that is generally parallel to a plane containing the axis of said handle,
      each of said distal portions having a slot therein,
   (c) a tined portion mounted on said distal portions and extending therefrom in a direction away from a second plane containing said axis and perpendicular to said first-mentioned plane, and
   (d) a generally rectangular metal blade portion mounted on said distal portions in articulated relationship,
      the metal forming said blade portion being flexible and springy,
      said blade portion extending away from said second-mentioned plane in a direction generally opposite to the direction of extension of said tined portion,
      said blade portion having sides that flex and that connect to bent-over end portions adapted to be inserted inwardly through said slots after said sides have flexed apart,
      said end portions being maintained in inserted condition in said slots due to inward flexing of said sides,
      the sizes of said end portions relative to the sizes of said slots being such that said blade portion may pivot through a small angle in directions generally parallel to said first-mentioned plane,
      said blade portion having substantially the same dimension as said tined portion in a direction parallel to said second-mentioned plane.

9. The invention as claimed in claim 8, in which each of said distal portions has a gap therein that communicates with said slots, in which said tined portion has a base inserted through said gap into said slots, said base being welded to said distal portions at opposite sides of said gaps.

* * * * *